United States Patent [19]
Ghandehari

[11] Patent Number: 5,341,275
[45] Date of Patent: Aug. 23, 1994

[54] COMPACT LIGHT SOURCE FOR FIBER OPTICS ILLUMINATION

[76] Inventor: Abbas Ghandehari, 711 April Dr., Huntington Beach, Calif. 92648

[21] Appl. No.: 823,667

[22] Filed: Jan. 22, 1992

[51] Int. Cl.⁵ .............................................. F21V 7/04
[52] U.S. Cl. ...................... 362/32; 362/293; 362/294; 359/385; 385/31
[58] Field of Search ............... 362/32, 294, 373, 293; 385/31, 27, 33, 39; 359/385

[56] References Cited

U.S. PATENT DOCUMENTS

| | | | |
|---|---|---|---|
| 3,437,804 | 4/1969 | Schaefer et al. | 362/32 |
| 3,461,282 | 8/1969 | Martinez | 362/32 |
| 3,733,481 | 5/1973 | Kuyt | 240/47 |
| 3,775,606 | 11/1973 | Bazell et al. | 240/47 |
| 4,025,779 | 5/1977 | Ahroni | 240/10 L |
| 4,123,172 | 10/1978 | French | 362/32 |
| 4,206,494 | 6/1980 | Lovering | 362/32 |
| 4,392,187 | 7/1983 | Bornhorst | 362/233 |
| 4,454,568 | 6/1984 | Stadnik | 362/32 |
| 4,529,264 | 7/1985 | Schmidt et al. | 385/31 |
| 4,704,660 | 11/1987 | Robbins | 362/32 |
| 4,914,556 | 4/1990 | Richardson | 362/293 |
| 4,933,816 | 6/1990 | Hug et al. | 362/32 |
| 5,053,629 | 10/1991 | Thompson | 359/385 |

Primary Examiner—Richard R. Cole
Assistant Examiner—Alan B. Cariaso

[57] ABSTRACT

An apparatus is provided for illuminating a fiber optic cable. A light source projects an illuminating light beam through a cold mirror placed at approximately a 45° angle to the direction of the light beam, whereby a visible component of the light beam is reflected in a direction normal to the light beam while a heat component of the light beam is passed through the cold mirror. A heat sink absorbs the heat component of the light beam. A ventilation duct at the heat sink is also included to conduct convective heat away from the apparatus. A plano-convex lens focuses the light beam at a focal point in space. A conduit support is included to support the fiber optic cable in a position incident to the light beam. The support has a cone-shaped aperture positioned coaxially with a diverging cone of the light beam from the focal point, and receives the diverging cone therein such that the conduit, coaxially inserted into the cone-shaped aperture, accommodates the total diverging cone of the light beam thereon. A heat shield is positioned in the path of the light beam, the shield having an aperture for passing the light beam therethrough while absorbing heat therein. A variable bandpass filter is positioned at the focal point of the light beam for passing a specific color of light therethrough, and includes a plurality of discrete filter elements and a motor for positioning any of the elements in the path of the light beam. A variable density filter is positioned in the path of the light beam for controlling the amount of light passing therethrough to the conduit.

9 Claims, 1 Drawing Sheet

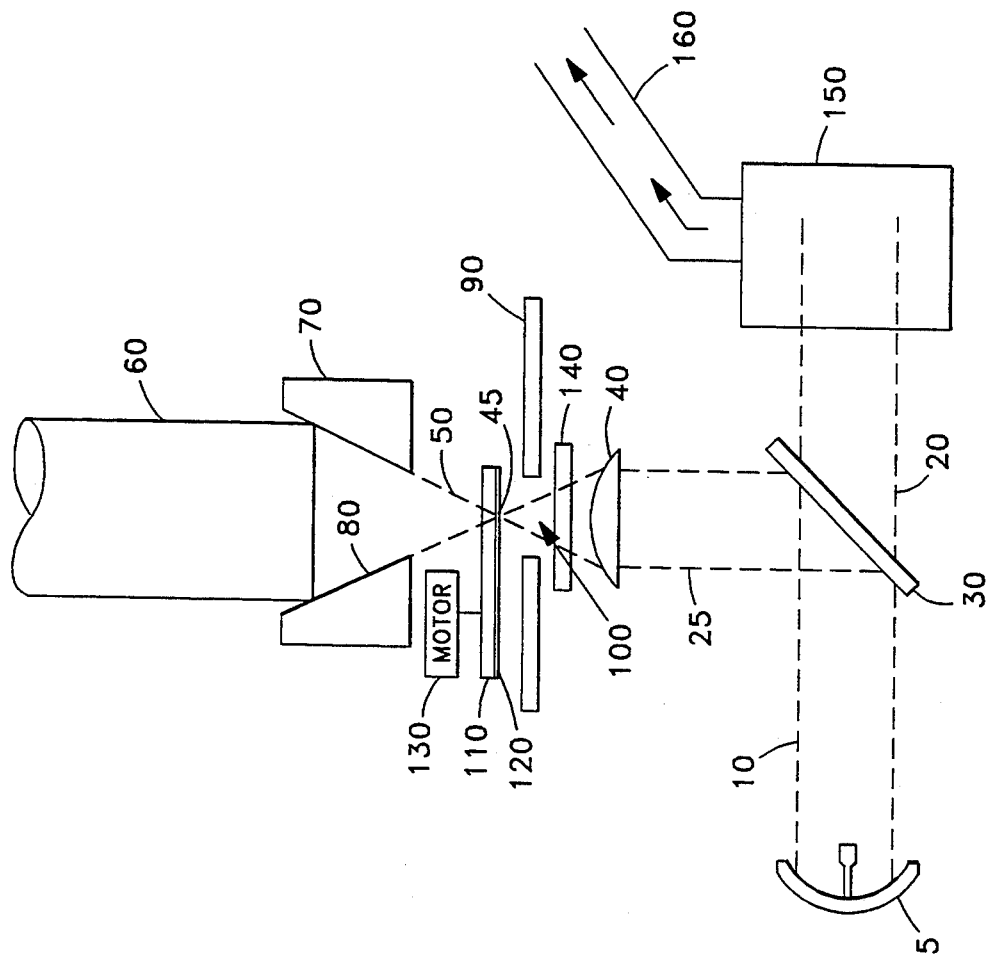
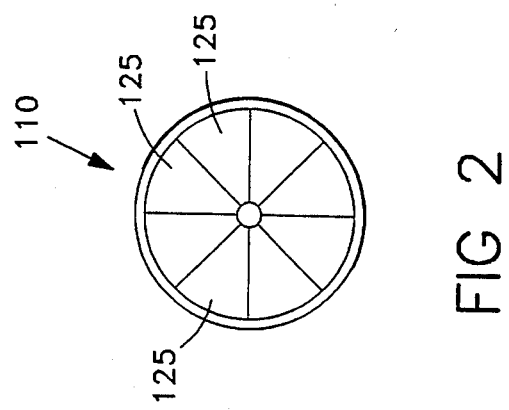

COMPACT LIGHT SOURCE FOR FIBER OPTICS ILLUMINATION

FIELD OF THE INVENTION

This invention relates generally to illumination systems and, more particularly, to a high-intensity fiber optic illumination system.

BACKGROUND OF THE INVENTION

Illumination systems for fiber optic cables are well known in the art. Typical illumination systems can be found, for example, in U.S. Pat. No. 3,733,481 to Kuyt on May 15, 1973; U.S. Pat. No. 3,775,606 to Bazell et al. on Nov. 27, 1973; U.S. Pat. No. 4,704,606 to Robbins on Nov. 3, 1987. In such devices, a light source is usually aligned with the end of at least one fiber optic cable to be illuminated. Further, such devices typically employ a combination of methods to reduce the heat component of the light entering the end of the fiber optic cable, as excess heat can cause damage to the fiber optic cable and other components of the device. For example, various heat shields, hot mirrors, and cooling elements, such as fans, have been known to be positioned within and around the light beam to reduce the amount of heat introduced to the end of the cable and within the device in general.

To date, however, no effective method has been found to significantly reduce the heat component of the light beam without using relatively expensive cooling apparati, such as a fans. Moreover, such prior-known devices typically allow a large fraction of the total light output from the light source to escape capture by the fiber optic cable. Those prior-known devices that, through use of lenses, focus the light beam into the fiber optic cable are generally restricted to one size of fiber optic cable. Moreover, precise positioning of the fiber optic cable within the support means of such devices is extremely critical and, as a result, often is not achieved adequately. As a result, prior-known devices are often inefficient at capturing as much of the light as might otherwise be possible.

Clearly there is a need for fiber optic illumination apparatus that minimizes the amount of internal heat retained within the apparatus inexpensively. Such a needed device would further be extremely compact in size, taking advantage of focused light both to filter the light and to more efficiently and completely direct the light into the fiber optic cable. Moreover, such a needed device would be designed to accept a wide variety of fiber optic cable sizes or bundle sizes. The present invention fulfills these needs and provides further related advantages.

SUMMARY OF THE INVENTION

The present invention is a light source for projecting an illuminating light beam of broadband energy components, including a heat component. A means for rejecting the heat component of the light beam is included, such as a cold mirror placed at approximately a 45° angle to the direction of the light beam so that the visible components of the light beam are reflected in a direction normal to the light beam while the heat component of the light beam is passed through a cold mirror. A heat sink absorbs the heat component of the light beam and other heat generated by the light source and has vertical fins for natural upward convective cooling. A ventilation duct may also be included to conduct convective heat away from the apparatus. A means for focusing the light beam, such as a plano-convex lens, causes the light beam to pass through a focal point in space, forming a diverging cone therefrom. A supporting means is included to support a conduit, such as a fiber optic cable, in a position incident to the light beam. The supporting means has a cone-shaped aperture positioned coaxially with the diverging cone of the light beam, and receives the diverging cone therein such that the conduit, coaxially inserted into the cone-shaped aperture, accommodates the total diverging cone of the light beam thereon. A heat shield is positioned in the path of the light beam, the shield having an aperture for passing the light beam therethrough while absorbing heat therein. Moreover, a variable bandpass filter means is positioned in the path of the light beam for passing a specific color of light therethrough. The filter means preferably includes a plurality of discrete filter elements, and further includes a drive means for positioning any of the elements in the path of the light beam. A heat rejection coating means is attached to the filter for additionally filtering heat elements from the light beam. Ideally, the filter elements are positioned at the focal point of the light beam so that each filter element can be relatively small. A variable density filter means may also be positioned in the path of the light beam for controlling the amount of light passing therethrough to the conduit.

The present invention succeeds in separating the visible component of the light beam from the heat component of the light beam before focussing and filtering of the visible component occurs. As such, the present invention does not require extensive use of cooling fans, heat sink, and the like along the path of the visible light beam, allowing for relatively simple and inexpensive manufacturing thereof. Moreover, as the bandpass filter elements are located at the focal point of the light beam, such filter elements may be relatively small and inexpensive. Further, a greater number of such filter elements maybe included on a color wheel of standard size, if desired. A further advantage of the present invention is evident in the use of the cone-shaped conduit supporting means that ensures complete capture of the light cone within the conduit while the conduit is fully inserted therein. The use of such a cone-shaped conduit supporting means with a fully inserted conduit maximizes the amount of light captured by the conduit, thereby increasing efficiency of the apparatus. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a schematic representation of the elements of the invention, illustrating a light beam of the invention separated into heat and visible components; and FIG. 2 is a front elevational view of a filter means of the invention, illustrating a plurality of discrete filter elements.

DETAILED DESCRIPTION OF THE PREFERRED EMBODIMENT

FIG. 1 shows a light source 5 for projecting an illuminating light beam 10 of broadband energy components, including a heat component 20 and visible component 25. A heat component rejection means 30 is included, such as a cold mirror placed at approximately a 45° angle to the direction of the light beam 10 so that the visible component 25 of the light beam 10 is reflected in a direction normal to the light beam 10 while the heat component 20 of the light beam 10 is passed through the heat component rejection means 30. A heat sink 150 for absorbing the heat component 20 of the light beam 10 and other heat generated by the light source 5 has vertical fins for natural upward convective cooling. A ventilation duct 160 may also be included to conduct convective heat away from the apparatus. In an embodiment of the invention wherein the light source 5 has a relatively powerful output, a fan or other air-cooling means (not shown) may be included to more quickly cycle air through the ventilation duct 160. Preferably, the light source 5 is a high-intensity light source such as a halogen or metal halide lamp.

A focussing means 40 the visible light beam 25, such as a plano-convex lens or the like, causes the visible light beam 25 to pass through a focal point 45 in space, forming a diverging cone 50 therefrom. A supporting means 70 is included to support a conduit 60, such as a fiber optic cable, in a position incident to the visible light beam 25. The supporting means 70 has a cone-shaped aperture 80 positioned coaxially with the diverging cone 50 of the visible light beam 25, such that the cone of the light beam 25 is coincident with the cone-shaped aperture 100 in direct congruence, and receives the diverging cone 50 therein such that the conduit 60, coaxially inserted into the cone-shaped aperture 80, receives the total diverging cone 50 of the visible light beam 25 thereon. A heat shield 90 is positioned in the path of the visible light beam 25, the shield having an aperture 100 for passing the visible light beam 25 therethrough while absorbing heat therein.

Further, a variable bandpass filter means 110 is positioned in the path of the visible light beam 25 for passing a specific color of light therethrough. The filter means 110 preferably includes a plurality of discrete filter elements 125, and further includes a drive means 130 for positioning any of the elements 125 in the path of the visible light beam 25. Alternately, the filter means 110 may be a continuously variable bandpass filter. Preferably, the filter means incudes the use of colored dichroic glass filter elements. A heat rejection coating means 120 is attached by coating or other means, to the filter means 110 for additionally filtering heat elements from the visible light beam 25. Ideally, the filter elements 125 are positioned at the focal point 45 of the visible light beam 24 so that each element 125 can be relatively small while still fully encompassing the visible light beam.

A variable density filter means 140 may also be positioned in the path of the visible light beam 25 for controlling the amount of light passing therethrough to the conduit 60. Alternatively, a variable power source (not shown) for the light source 5 may be included for controlling the intensity of the light beam 10 emanating from the light source 5 for controlling the intensity of the visible light beam 25 entering the conduit 60. Moreover, a temperature sensor may be included that shuts off the power source in the event that the temperature within the apparatus reaches a predetermined level (not shown). In operation, the light beam 10 emanating from the light source 5 strikes the heat component rejecting means 30 and is divided into a visible light beam 25 and a heat component 20. The heat component 20, consisting primarily of infrared energy, passes through the heat component rejecting means 30 and into the heat sink 150, where heat is carried away from the apparatus by convection. The visible light beam 25 is reflected by the heat component rejecting means 30 and then passed through the focussing means 40 and the variable density filter means 140. Then the visible light beam 25 passes through the filtering means 110 located at the focal point 45. The visible light beam 25, forming a diverging cone 50 of filtered light, enters the cone shaped aperture 80 wherein the cone 50 completely fills the aperture 80 such that the conduit 60, placed without the aperture 80, receives the entire cone 50. In this way total coupling of the cone 50 with the conduit 60 is assured as long as the conduit 60 is inserted fully into the aperture 80 and the cone 50 is exactly aligned with the aperture 80.

While the invention has been described with reference to a preferred embodiment, it is to be clearly understood by those skilled in the art that the invention is not limited thereto. Rather, the scope of the invention is to be interpreted only in conjunction with the appended claims.

I claim:

1. An illumination apparatus, comprising:
   a light source for projecting an illuminating light beam, the light beam having broadband energy components including a heat component;
   means for rejecting the heat component of the light beam;
   means for focusing the light beam so that the beam passes through a point in space forming a diverging cone therefrom;
   a conduit to receive the diverging cone for conducting the light beam;
   means for supporting the conduit in a position incident to the light beam, the support means having a cone-shaped aperture, the aperture positioned coaxially with the diverging cone of the light beam such that the cone of the light beam is coincident with the cone-shaped aperture in direct congruence such that the conduit, coaxially inserted into the cone-shaped aperture, receives the total diverging cone of the light beam thereon.

2. The apparatus of claim 1 further including a heat shield positioned in the path of the light beam, between the focusing means and the conduit, the shield having an aperture for passing the light beam, the shield preventing stray and scattered light and heat from passing to the conduit.

3. The apparatus of claim 2 further including variable bandpass filter means positioned in the path of the light beam between the heat shield and the aperture for passing a single color of choice.

4. The apparatus of claim 3 further including heat rejection means coated on the filter in order to reflect incident heat.

5. The apparatus of claim 3 wherein the filter means includes a plurality of discrete filter elements, and further including a drive means for positioning any one of the elements in the path of the light beam.

6. The apparatus of claim 5 wherein each of the discrete filter elements are positionable at the focal point of the light beam, whereby the elements may be made arbitrarily small, yet provide efficient filtering of the light beam.

7. The apparatus of claim 1 further including a heat sink for absorbing, the heat component of the light beam and other heat generated by the light source, for natural convective cooling thereof.

8. An illumination apparatus, comprising:
- a light source for projecting an illuminating light beam, the light beam having broadband energy components including a heat component;
- a cold mirror for rejecting the heat component of the light beam, the cold mirror placed at an angle of 45 degrees to the direction of the light beam so that the visible components are reflected in a direction normal to the light beam while the heat component is passed through the cold mirror to be absorbed;
- means for focussing the light beam so that the beam passes through a point in space and presents a diverging cone therefrom, the focusing means being a plano-convex lens;
- a heat shield positioned in the path of the light beam, the shield having an aperture for passing the light beam;
- a variable bandpass filter means positioned in the path of the light beam for passing a single color of choice;
- a conduit to receive the diverging cone for conducting the light beam;
- means for supporting the conduit in a position incident to the light beam, the support means having a cone-shaped aperture, the aperture positioned coaxially with the diverging cone of the light beam such that the cone of the light beam is coincident with the cone-shaped aperture in direct congruence such that the conduit, coaxially inserted into the cone-shaped aperture, receives the total diverging cone of the light beam thereon;
- a heat sink for absorbing, the heat component of the light beam and other heat generated by the light source, the heat sink having vertical fins for natural upward convective cooling thereof.

9. An illumination apparatus, comprising:
- a light source for projecting an illuminating light beam, the light beam having broadband energy components including a heat component;
- a cold mirror for rejecting the heat component of the light beam, the cold mirror placed at an angle of 45 degrees to the direction of the light beam so that the visible components are reflected in a direction normal to the light beam while the heat component is passed through the cold mirror to be absorbed;
- means for focussing the light beam so that the beam passes through a point in space and presents a diverging cone therefrom, the focusing means being a plano-convex lens;
- a heat shield positioned in the path of the light beam, the shield having an aperture for passing the light beam;
- a variable bandpass filter means positioned in the path of the light beam for passing a single color of choice;
- a conduit to receive the diverging cone for conducting the light beam;
- means for supporting the conduit in a position incident to the light beam, the support means having a cone-shaped aperture, the aperture positioned coaxially with the diverging cone of the light beam such that the cone of the light beam is coincident with the cone-shaped aperture in direct congruence such that the conduit, coaxially inserted into the cone-shaped aperture, receives the total diverging cone of the light beam thereon;
- a heat sink for absorbing, the heat component of the light beam and other heat generated by the light source, the heat sink having vertical fins for natural upward convective cooling thereof;
- at least one ventilation duct placed so as to conduct convective heat away from the apparatus.

* * * * *